United States Patent
Klein et al.

(10) Patent No.: US 10,743,484 B2
(45) Date of Patent: Aug. 18, 2020

(54) PRECIPITATION SENSING TO VARY IRRIGATION SCHEDULES

(71) Applicant: RACHIO, INC., Denver, CO (US)

(72) Inventors: Christopher M. Klein, Denver, CO (US); Robert W. Selover, Denver, CO (US)

(73) Assignee: RACHIO, INC., Denver, CO (US)

( * ) Notice: Subject to any disclaimer, the term of this patent is extended or adjusted under 35 U.S.C. 154(b) by 0 days.

(21) Appl. No.: 15/955,482

(22) Filed: Apr. 17, 2018

(65) Prior Publication Data

US 2018/0295797 A1    Oct. 18, 2018

Related U.S. Application Data

(60) Provisional application No. 62/486,263, filed on Apr. 17, 2017.

(51) Int. Cl.
*A01G 25/16* (2006.01)

(52) U.S. Cl.
CPC .... *A01G 25/167* (2013.01); *G05B 2219/2625* (2013.01)

(58) Field of Classification Search
None
See application file for complete search history.

(56) References Cited

U.S. PATENT DOCUMENTS

| | | | | |
|---|---|---|---|---|
| 5,870,302 | A  * | 2/1999 | Oliver | A01G 25/167 700/11 |
| 7,123,993 | B1 * | 10/2006 | Freeman | A01G 25/16 700/284 |
| 2015/0319941 | A1 | 11/2015 | Klein et al. | |
| 2016/0157446 | A1 * | 6/2016 | Bentwich | A01G 25/167 700/284 |
| 2017/0118930 | A1 * | 5/2017 | Bangalore | A01G 25/167 |

* cited by examiner

*Primary Examiner* — Sean Shechtman
(74) *Attorney, Agent, or Firm* — Dorsey & Whitney LLP (57) ABSTRACT

The present disclosure relates to methods and systems for varying irrigation schedules for a watering system (e.g., sprinkler system) based on detected precipitation. In one example, a system includes a rain sensor for detecting rain in a location where the rain sensor outputs a continuous rain signal when saturated with a threshold level of rain. The system also includes a sprinkler controller communicatively coupled to the rain sensor. The sprinkler controller opens one or more sprinkler valves based on a watering schedule. When the threshold level of rain is received, the sprinkler controller receives the rain signal during a saturation window of the rain sensor and varies the watering schedule based on rain detected by the rain sensor, where the variation to the watering schedule occurs outside of the saturation window of the rain sensor.

10 Claims, 7 Drawing Sheets

PRECIPITATION SENSING TO VARY IRRIGATION SCHEDULES

CROSS REFERENCE TO RELATED APPLICATIONS

This application claims the benefit of U.S. Provisional Application No. 62/486,263, entitled "Precipitation Sensing to Vary Irrigation Schedules," filed on Apr. 17, 2017, the entirety of which is incorporated herein by reference.

FIELD

The present disclosure relates generally to using precipitation sensors to make dynamic changes to irrigation schedules for one or more irrigation controllers.

BACKGROUND

Conventional landscape sprinkler systems set irrigation schedules manually at the beginning of a watering season and are typically not adjusted based on weather. Additionally, homeowners typically lack knowledge about landscaping and sprinkler systems to create an optimal irrigation schedule. This often results in an over-watered lawn with wasted water as runoff, an under-watered lawn, or both depending on the sprinkler zone or location within the sprinkler zone.

Recent advances in watering systems include smart watering systems. Smart watering systems control irrigation schedules of a sprinkler system. This may include automatically updating irrigation schedules based on qualitative and quantitative feedback and meteorological data. Smart sprinkler systems may match optimal or near-optimal irrigation schedules to sprinkler zones based on landscaping and sprinkler system characteristics. An example of a smart watering system is disclosed in U.S. Patent Application Publication No. 2015/0319941, entitled "System and method for an improved sprinkler control system," filed May 6, 2014, which is incorporated herein by reference for any and all purposes.

Some watering systems include sensors for detecting environmental conditions and may use those conditions to change a planned watering event. For example, a sprinkler system may include a rain sensor that cancels a planned watering event when the precipitation reaches a certain threshold. For example, when a threshold of water is absorbed (e.g., 0.5") by the rain sensor, the rain sensor sends a trip signal to the sprinkler controller, this trip signal persists until the sensor dries out. Conventional controllers use this signal to cancel a watering event, only if the signal is activated during the scheduled watering event. Accordingly, scheduling changes are dependent on the rain sensor activation window and in instances where the watering event occurs outside the saturation window of the rain sensor, the watering event may not be skipped. In this manner, vegetation may receive more water than needed, wasting water and potentially harming the vegetation.

SUMMARY

In one embodiment, a method for adjusting an irrigation schedule for an irrigation system is disclosed. The method includes receiving by a controller a precipitation signal corresponding to received precipitation from a precipitation sensor, transmitting the precipitation signal to a central controller, and receiving an adjusted irrigation schedule accounting for the received perceived precipitation.

In another embodiment, a method to adjust an irrigation schedule for one or more irrigation controllers is disclosed. The method includes receiving by a processing element rain sensor characteristics from one or more rain sensors positioned in a geographic location; translating by the processing element the rain sensor characteristics of the one or more rain sensors to one or more soil types in the geographic location; receiving by the processing element precipitation data from the one or more rain sensors; estimating by the processing element a moisture level in the one or more soil types in the geographic location using precipitation data and rain sensor characteristics; updating the irrigation schedule for the one or more irrigation controllers based on the moisture level; and transmitting the updated irrigation schedule to the one or more irrigation controllers.

In yet another embodiment, a watering system for vegetation is disclosed. The system includes a rain sensor for detecting rain in a location, wherein the rain signal outputs a continuous rain signal when saturated with a threshold level of rain; a sprinkler controller communicatively coupled to the rain sensor, wherein the sprinkler controller opens one or more sprinkler valves based on a watering schedule; and when the threshold level of rain is received, the sprinkler controller receives the rain signal during a saturation window of the rain sensor; and varies the watering schedule based rain detected by the rain sensor, wherein the variation to the watering schedule occurs outside the saturation window of the rain sensor.

SPECIFICATION

In some embodiments herein, a system for using detected precipitation to vary irrigation schedules is disclosed. The system includes one or more precipitation sensors that collect precipitation data used to vary one or more watering events. In one embodiment, the system utilizes the rain sensor data to alter scheduled watering events independent of the evaporation rate of the rain sensor, which is not possible with conventional sprinkler controllers.

In some embodiments, the system is able to convert a precipitation sensor signal into an estimated value of actual precipitation received at the sensor. In one embodiment, the system uses a training or calibration method to build a model to translate on/off times of the sensor with a precipitation value (e.g., inches or gallons received). For example, the sensor data can be correlated with the meteorological record to convert the data signal on/off times into actual watering gallons (or other metric). In one instance, the duration of the signal ON time of the sensor after the precipitation event has ended is correlated to a known evaporation rate to determine an estimate of the precipitation received.

Further, in some instances, the meteorological data includes expected precipitation, reported precipitation, as well as an evapotranspiration rate. Many meteorological sources report evapotranspiration rate, rather than pan evaporation rates, since agricultural resources prefer to rely on evapotranspiration rates rather than pan evaporation rates. In these instances, to increase the accuracy of the model, the meteorological data as received by the controller may be converted to straight evaporation (e.g., pan evaporation), rather than evapotranspiration. To do this, the following relationship can be used: evapotranspiration is evaporation multiplied against class A pan coefficient (Kp) factor, which is the grass reference evaporation factor. However, in other examples, the model may use the evapotranspiration data as received from the meteorological source.

In one example, a rain sensor including hygroscopic disks that swell when exposed to water is used to provide the rain sensor data. The rain sensor is set to generate a precipitation signal when the disks have absorbed a predetermined threshold of water, such as between 0.25" and 1" of water. The precipitation signal is set to remain on for as long as the rain sensor remains saturated and turn off when the sensor has dried below the set threshold. In this example, the rain sensor transmits the precipitation signal to the sprinkler controller for the time the signal persists. The sprinkler controller then stores precipitation data and optionally provides the precipitation data to a central sprinkler controller. This allows the detected precipitation to affect multiple schedules and the sprinkler controller can change watering events at any time, even those that fall outside of the evaporation window of the rain sensor.

For example, if it rains 0.2" at 6 am at the irrigation location, but stops raining for the rest of the day, and a watering event is scheduled at 6 pm, the rain sensor will have dried out and ceased transmitting the rain signals. However, at 6 am the sprinkler controller and/or central controller received the precipitation signal indicating that 0.2" of precipitation had been detected. This data point is fed into the scheduler, which may be integrated into either the central controller or the sprinkler controller, that then can adapt the water events scheduling for any number of schedules, including those that may not run for days. For example, if 0.2" of precipitation is received for a sprinkler zone having arid vegetation, the sprinkler controller may cancel all planned watering events for the week for that zone. In this manner, the system can dynamically adapt watering events to account for site conditions (e.g., soil, crop, type, etc.), based on received precipitation, including those that fall outside the saturation window of the precipitation sensor, making the changes to the schedule independent of the evaporation rate of the sensor.

In some embodiments, the sprinkler controller may also take into account the length of time that the precipitation signal remained on (e.g., the saturation window) in order to vary one or more schedules. For example, if the rain sensor sends a precipitation signal indicating that the rain threshold has been reached and the signal persists for 4 hours, the sprinkler controller and/or central controller can use this rain data to estimate the additional rain (e.g., rain that falls after the sensor has already reached the rain threshold) and/or humidity present in the zone and adjust watering schedules accordingly. In this example, the evaporation (e.g., evapotranspiration (ETo)) rate of the rain sensor is used to estimate further precipitation and weather past the detected threshold of the rain sensor and correlate precipitation levels estimated in the scheduling algorithms with other weather data to determine accuracy.

In other embodiments, the rain sensor data can be used to estimate soil moisture levels. For example, the sprinkler controller combines device characteristic information about the sensor, such as the absorption rate, porosity, etc., and correlates these characteristics to one or more soil types in the surrounding location. As the rain sensor data signal is activated, the sprinkler controller can use the activation time to better estimate the moisture in the soil.

Figure 1:
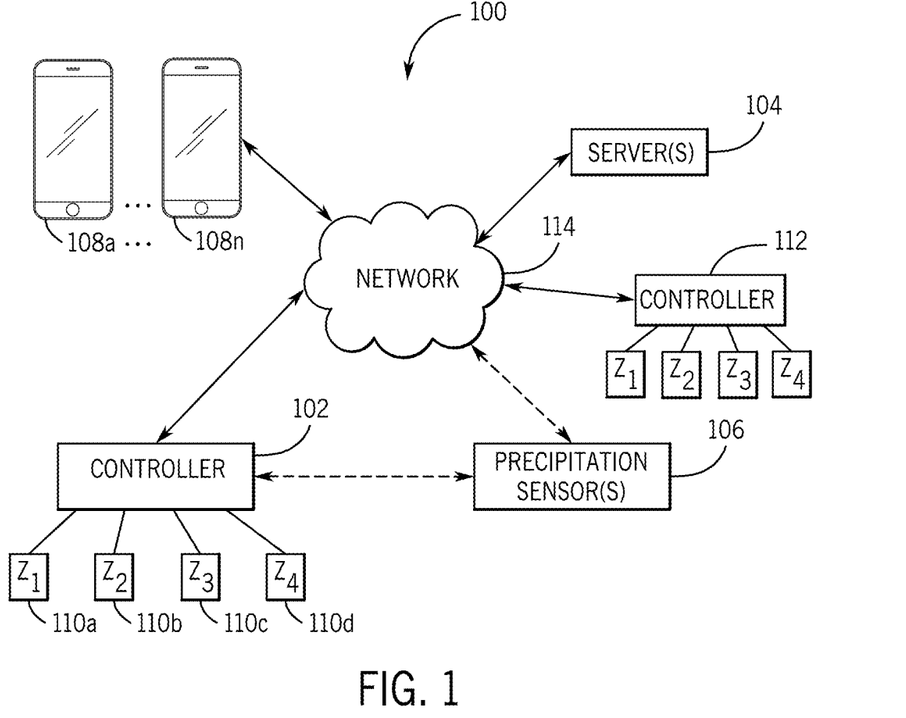
FIG. 1 is a block diagram illustrating an example of a watering system.

Turning now to the figures, a system of the present disclosure will be discussed in more detail. FIG. 1 is a block diagram illustrating an example of a watering or irrigation system 100. The system 100 includes one or more irrigation system controllers 102, 112 that each control one or more fluid delivery devices, e.g., sprinkler valves, irrigation drip lines, and the like, for one or more irrigation zones 110a, 110b, 110c, 110d. The irrigation controllers 102, 112 are each in communication with one or more central controllers or servers 104, which in turn may be in communication with one or more user devices 108-108n, via a network 114. At least one of the irrigation controllers 102, 112 and/or the central controller 104, is in communication with a precipitation sensor 106 that detects precipitation for one or more locations, as discussed in more detail below. Each of the various components of the watering system 100 may be in communication directly or indirectly with one another, such as through the network 114. In this manner, each of the components can transmit and receive data from other components in the system. In many instances, the central controller 104 may act as a go between for some of the components in the system 100.

The network 114 may be substantially any type or combination of types of communication system for transmitting data either through wired or wireless mechanism (e.g., WiFi, Ethernet, Bluetooth, cellular data, or the like). In some embodiments, certain components in the watering system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 114 and communication mechanisms for each of the components may be varied as desired and based on the needs of a particular configuration or property.

The irrigation system controllers 102, 112 control water flow to one or more water outlets, such as sprinkler valves, irrigation lines, sprinkler heads, or the like. In one embodiment, the irrigation system controllers 102, 112 are smart sprinkler controllers having processing elements and memory and control the operation of a plurality of sprinkler valves in one or more watering zones for a particular property or area (e.g., residential property). An example of a sprinkler controller that may be used with the system 100 can be found in U.S. Publication No. 2015/0319941 filed on May 6, 2014 and entitled "Sprinkler and Method for an Improved Sprinkler Control System," which is incorporated by reference herein in its entirety. The sprinkler valves may be electronically operated, such as one or more solenoid valves that open and close a flow path to a sprinkler head. The irrigation system controllers 102, 112 may include one or more components such as those shown in FIG. 7.

The central controller 104 or server is one or more computing devices that process and execute information. The central controller 104 may include its own processing elements, memory components, and the like, and/or may be in communication with one or more external components (e.g., separate memory storage) (an example of computing elements that may be included in the central controller 104 is disclosed below with respect to FIG. 7). The central controller 104 may also include one or more server computers that are interconnected together via the network 114 or separate communication protocol. The central controller 104 may host and execute a number of the processes executed by the system 100 and/or the irrigation system controllers 102, 112.

The user devices 108a, 108n are various types of computing devices, e.g., smart phones, tablet computers, desktop computers, laptop computers, set top boxes, gaming devices, wearable devices, or the like. The user devices 108a, 108n provide output to and receive input from a user. For example, the central controller 104 may transmit one or more alerts to the user devices 108a, 108n to indicate information regarding the irrigation system controllers 102, 112, fluid outlets, and/or the property being watered. The type and number of user devices 108a, 108n may vary as desired.

The precipitation sensor 106 is substantially any type of device that can detect precipitation and/or fluid levels and transmit an electrical signal. The precipitation sensor 106 may transmit the precipitation signal to the network 114 and/or controller 102 via hardwired or wireless methods (e.g., WiFi, radio signals, Bluetooth, etc.). As one example, the precipitation sensor 106 includes one or more hygroscopic disks that swell as they absorb liquid, and when swollen to a predetermined threshold, activate an electrical switch, e.g., as the disk expands it is set to actuate a lever or switch from an off position to an on position and as the disk shrinks as the fluid evaporates, the switch is deactivated. In some embodiments, the threshold may be set relatively low (e.g., ⅛") in order to capture as many data points as possible, which as discussed below, can be used to increase the predictive power of the model used by the system 100.

As another example, the precipitation sensor 106 may have a water collecting basin that when it reaches a predetermined weight threshold (e.g., containing a predetermined volume of fluid), will activate a switch. As yet another example, the precipitation sensor 106 may use a water level within a basin to trip a switch to activate the precipitation signal. Many other types of sensors may be used that can be set to activate a precipitation signal upon detecting a predetermined threshold of precipitation (e.g., 0.25" to 2"), e.g., optical sensors, or the like.

In many embodiments, the precipitation sensor 106 activates a precipitation signal that is persistent and remains "on" for the length of time that a fluid level remains within the sensor. In some instances, the signal may remain ON during a saturation window for the sensor. In these embodiments, the precipitation signal may remain ON until the fluid has evaporated from the sensor (e.g., the disks have dried out) or the fluid has been emptied. In other examples, the precipitation sensor may be configured to output a data point corresponding to a received precipitation value. In these instances, the data may be used directly by the controller, rather than translated, as discussed below.

Figure 2:
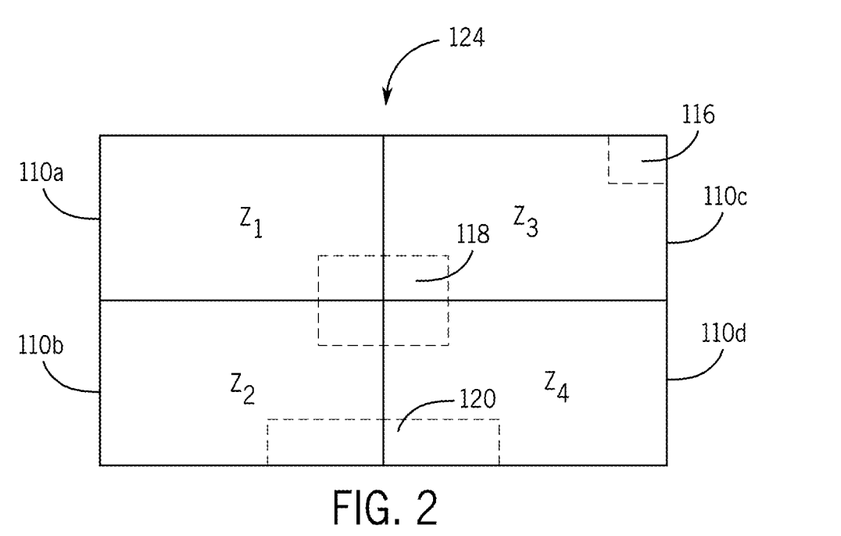
FIG. 2 is a diagram of an irrigation area watered by the watering system of FIG. 1 illustrating potential locations of a precipitation sensor.

The precipitation sensor 106 is typically positioned in, near, or adjacent to, an irrigation area 124 watered by the watering system 100 and irrigation controller 102. The precipitation sensor 106 may be positioned in substantially any location of the irrigation area 124, but in some embodiments, may be positioned in one or more of the zones 110a, 110b, 110c, 110d. FIG. 2 is a diagram of an irrigation area 124 illustrating potential locations of the precipitation sensor 106. With reference to FIG. 2, in some embodiments, the precipitation sensor 106 may be positioned in a single zone as shown by position 116, two zones as shown by position 120, or multiple zones as shown by position 118. Alternatively or additionally, the system 100 may include multiple precipitation sensors 106 across the area 124 that may be positioned in multiple zones 110a, 110b, 110c, 110d or near the irrigation area or zones. The location and positioning of the precipitation sensors 106 may be varied based on the size, location, vegetation variation, and/or weather of the irrigation area 124.

Figure 3:
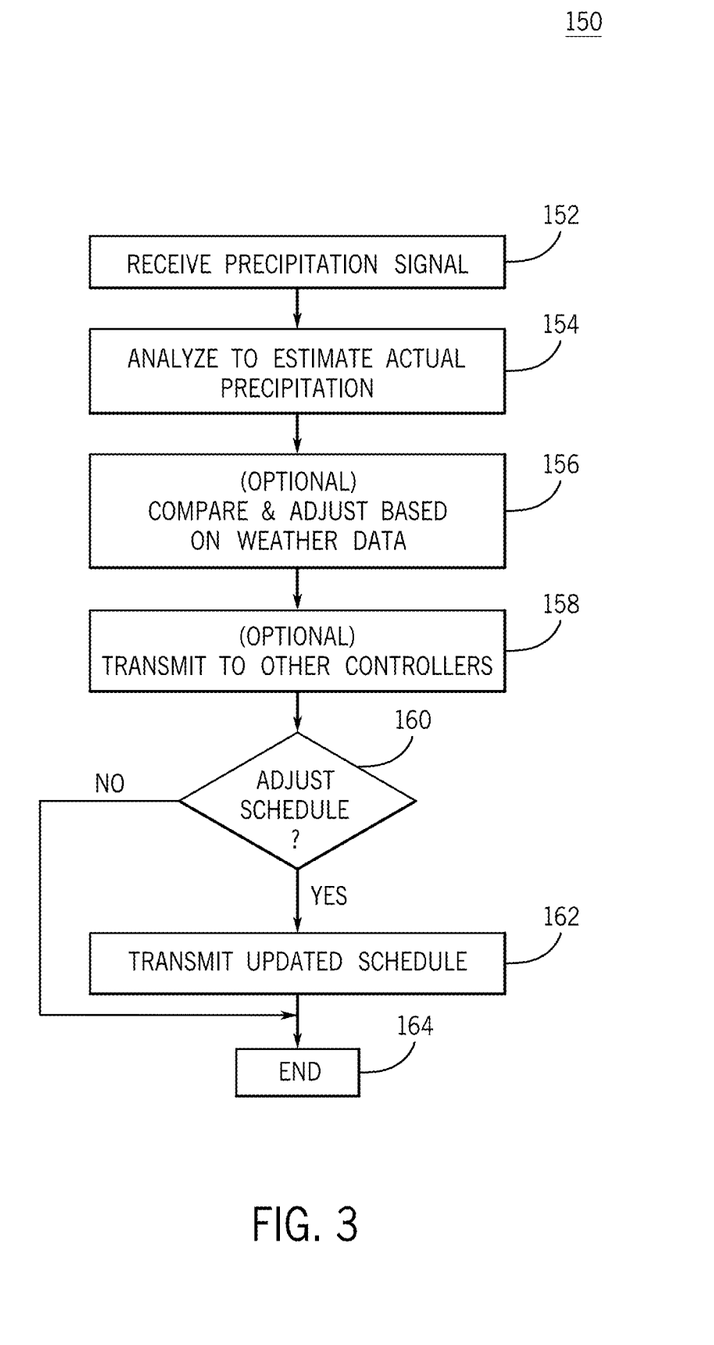
FIG. 3 is a flow chart illustrating a method for varying one or more irrigation schedules of the watering system based on detected precipitation.

FIG. 3 is a flow chart illustrating a method for varying one or more irrigation schedules based on detected precipitation. The method 150 begins with operation 152 and the central controller 104 receives a precipitation signal from the precipitation sensor 106. The precipitation sensor 106 may send the precipitation signal directly to the central controller 104, e.g., via network 114, or may send the precipitation signal indirectly, such as transmitting the signal first to the irrigation controller 102, which in turn transmits the precipitation signal to the central controller 104. The precipitation signal may be a persistent signal, such as an "ON" signal indicating that a predetermined threshold of precipitation has been detected by the precipitation sensor 106. In this example, the signal may continue for as long as the threshold remains triggered, e.g., until the moisture has begun to evaporate or the device remains saturated. Additionally, the precipitation signal may not include data, such as fluid detected above the activation threshold, or the like, but merely indicate that the threshold has been passed, or pulsed, coded, or otherwise quantitative readings of precipitation amounts or moisture content. In other embodiments, the precipitation signal may not be a persistent signal and may be tracked as a data point that indicates when the threshold was first reached and a second data point when the moisture in the precipitation sensor 106 drops below the threshold.

With reference to FIG. 3, after operation 152, the method 150 proceeds to operation 154 and the central controller 104 analyzes the precipitation signal, along with other data, to estimate the actual precipitation. For example, the central controller 104 may access sensor characteristic information about the precipitation sensor 106 (e.g., type of sensor, material porosity, evaporation and/or evapotranspiration rates, etc.), as well as data about the irrigation area 124, such as the geographical location, weather history (e.g., solar radiation, temperature, dew point), wind, and positioning of the precipitation sensor 106 in the irrigation area 124, and use this data to estimate the actual precipitation received in the irrigation area 124 and/or particular zone 110a, 110b, 110c, 110d. The central controller 104 can use the actuation threshold of the precipitation sensor (e.g., 0.5" of rain), along with the humidity and temperature in the irrigation area 124, to know the length of time that the precipitation sensor 106 will remain saturated without further precipitation. Other factors may include latent heat of evaporation or sublimation (e.g., heat at which vapor converts to a liquid) and/or psychrometric function.

For example, the central controller 104 may determine that for the brand and model of the precipitation sensor 106, a 0.5" of rain on July $4^{th}$ will saturate the disk sufficiently that it remains wet for 30 minutes and that 2" of precipitation will saturated the disk such that it remains wet for 120 minutes. With this example, as well as data corresponding to the precipitation signal, such as activation and deactivation times, the central controller 104 can determine the actual rain fall in the irrigation area 124, e.g., the precipitation signal remains activated for 60 minutes on July $4^{th}$ means that 1.0" of rain fell in the irrigation area 124. As one example, the system may use the following equation:

Evaporation (in)=Sensor Signal ON (days)×ET (in/day)

In the above equation, evaporation can be correlated to the actual amount in inches of precipitation received at the sensor by using the signal time on (days) multiplied by the evapotranspiration (or translated to pan evaporation) detected in inches/day. At a high level, by determining how much water evaporated out of the sensor, the system can predict how much water was collected, i.e., a mass balance for the sensor.

With reference again to FIG. 3, after operation 154 the method 150 may proceed to operation 156. In operation 156, the central controller 104 may compare and adjust the estimated actual precipitation with expected weather. The detected precipitation may be compared with weather surveillance radar to determine whether the detected value is accurate or should be adjusted. For example, if the detected precipitation is 1" based on the ETo and threshold values of the precipitation sensor 106, but the weather radar detected heavy precipitation in the location near the irrigation area 124, the central controller 104 may determine that the detected precipitation is likely lower than what was actually shown by the sensor data alone. This may be due to a number of reasons, such as calibration of the precipitation sensor 106, typical noise in the precipitation signal, debris blocking the precipitation sensor 106, high air circulation (e.g., wind) causing an increased evaporation rate, or the like. As another example, the weather data compared against the detected precipitation may be the precipitation detected at other precipitation sensors 106 in other locations near the area 124. For example, the central controller 104 may receive precipitation signals from multiple precipitation sensors 106 distributed near the irrigation area 124. These multiple signals can be used to increase the accuracy for any given signal, by helping to reduce noise and error, and the central controller 104 can use an average or other value calculated using the multiple inputs. In this example, errors caused by hardware, location, or the like can be reduced or eliminated.

After operation 156, the method 150 may proceed to operation 158. In operation 158, the central controller 104 may transmit the precipitation signal to other controllers 102 or may otherwise use the precipitation signal to adjust the detected precipitation for different irrigation areas 124 irrigated by various irrigation controllers 102. The transmitted signal may be the adjusted detected precipitation signal or the raw precipitation signal received from the precipitation sensor 106.

With continued reference to FIG. 3, after operation 158, the method may proceed to operation 160. In operation 160, the central controller 104 and/or the irrigation controller 102 determine whether to adjust the irrigation schedule for the irrigation area 124 based on the detected precipitation. In particular, the central controller 104 may evaluate the detected precipitation and compare that to the expected weather for the following days, the watering needs of the vegetation, ETo for the vegetation and the like, to determine whether the watering times, frequency, and/or days should be varied. As a specific example, if 2" of precipitation is detected on Monday at 6 pm and the next watering event is scheduled for the irrigation area 124 Tuesday at 5 am, but the detected precipitation is sufficient for three days for the vegetation, the central controller 104 may skip the Tuesday watering, as well as any watering events scheduled for Wednesday. As another example, watering events may be shortened to account for the actual precipitation received by the irrigation area 124. Notable is that the central controller 104 can use the detected precipitation signal to adjust schedules far into the future, long after the persistent signal from the precipitation sensor 106 may have terminated, e.g., outside of the saturation window of the precipitation sensor 106. This type of adjustment is not possible with conventional sprinkler controllers, where the adjustment of a watering event is only while the precipitation signal is activated. Additionally, in many conventional sprinkler systems, the precipitation signal is not sent to a centralized server than can use the data to adjust the irrigation schedules of multiple sprinkler systems, including those that may not include a precipitation sensor.

If in operation 160, the central controller 104 determines that the schedule does not need to be adjusted (e.g., precipitation already taken into account with weather analysis, insufficient precipitation was received, system not scheduled to water, or the like), then the method 150 may proceed to an end state 164. On the other hand, if the central controller 104 determines that the schedule should be adjusted, the method 150 proceeds to operation 162 and the central controller 104 transmits the adjusted schedule to irrigation controller 102. The irrigation controller 102 can then adjust the activation of the various water outlets for the zones 110a, 110b, 110c, 110d accordingly.

Figure 4A:
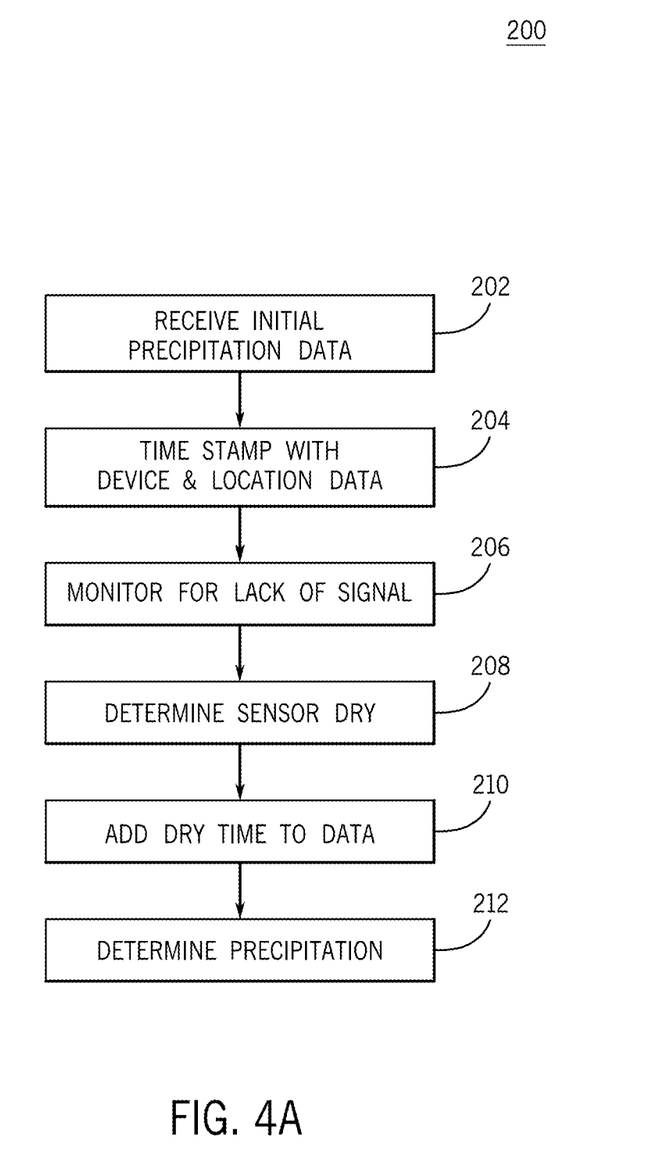
FIG. 4A is a flow chart illustrating a method for determining precipitation data to provide to the central controller of the watering system of FIG. 1.

A method for determining precipitation data to provide to the central controller 104 is shown FIG. 4A. The method 200 of FIG. 4A may be used to analyze the precipitation signal from the precipitation sensor 106 to provide the precipitation data to the central controller 104, such as in operation 152 in the method 150 of FIG. 3. Turning now to FIG. 4A, the method 200 may begin with operation 202 and the irrigation controller 102 may receive an initial precipitation signal from the precipitation sensor 106. The initial signal may be an ON signal indicating that the precipitation threshold has been reached, this signal may remain ON until the precipitation sensor 106 has dried sufficiently to deactivate, e.g., hydroscopic disks may shrink to below the activation threshold.

After operation 202, the method 200 may proceed to operation 204 and the irrigation controller 102 may time stamp the signal information along with characteristics of the precipitation sensor 106 (e.g., manufacture, make, model, etc.), location data of the precipitation sensor 106, threshold level set for the sensor 106, and the like. The sensor data may be stored in a memory device of the irrigation controller 102 and/or transmitted to the central controller 104.

After operation 204, the method 200 may proceed to operation 206 and the irrigation controller 104 may monitor the precipitation sensor 106 for deactivation of the precipitation signal. For example, in some embodiments, the precipitation sensor 106 may output a persistent signal when the threshold is reached, and when the precipitation drops below the threshold, such as due to evaporation after the rain has stopped, the precipitation sensor 106 may then discontinue transmitting the signal. In this example, the irrigation controller 102 may monitor for the OFF signal or when the precipitation signal 106 goes low or turns off.

Once the irrigation controller 104 detects that the precipitation sensor 106 has deactivated the ON signal, the irrigation controller 104 determines that the precipitation sensor 106 has dried below the activation threshold. Then, the method 200 may proceed to operation 210 and the irrigation controller 104 time stamps the dry time and saves the data.

With reference to FIG. 4A, in operation 212, the irrigation controller 104 uses the time stamp information for the ON/OFF times of the precipitation signal, as well as the sensor characteristics to determine the actual precipitation received in the irrigation area 124. For example, the irrigation controller 104 may utilize the expected or known evaporation rates of the sensor in different conditions and the ON time of the signal to determine the precipitation. The precipitation data may be supplemented with weather data, such as radar data, temperature, humidity, or the like, to provide additional metrics to determine the precipitation. For example, as the humidity increases in an area, a precipitation sensor may remain wet or ON longer for the same volume of precipitation received on a less humid day. Similarly, the sensor may remain wet longer on hot days than on more mild days.

In some embodiments, the irrigation controller 104 may calculate the estimated precipitation based on the time the precipitation sensor 106 was activated and the characteristics of the sensor and send that data to the central controller 104, which may then contextualize the estimated participation based on weather information. In other embodiments, the central controller 104 may perform all the calculations, with the irrigation controller 102 merely transmitting the ON/OFF times of the precipitation signal from the sensor 106 to the central controller 104.

Figure 4B:
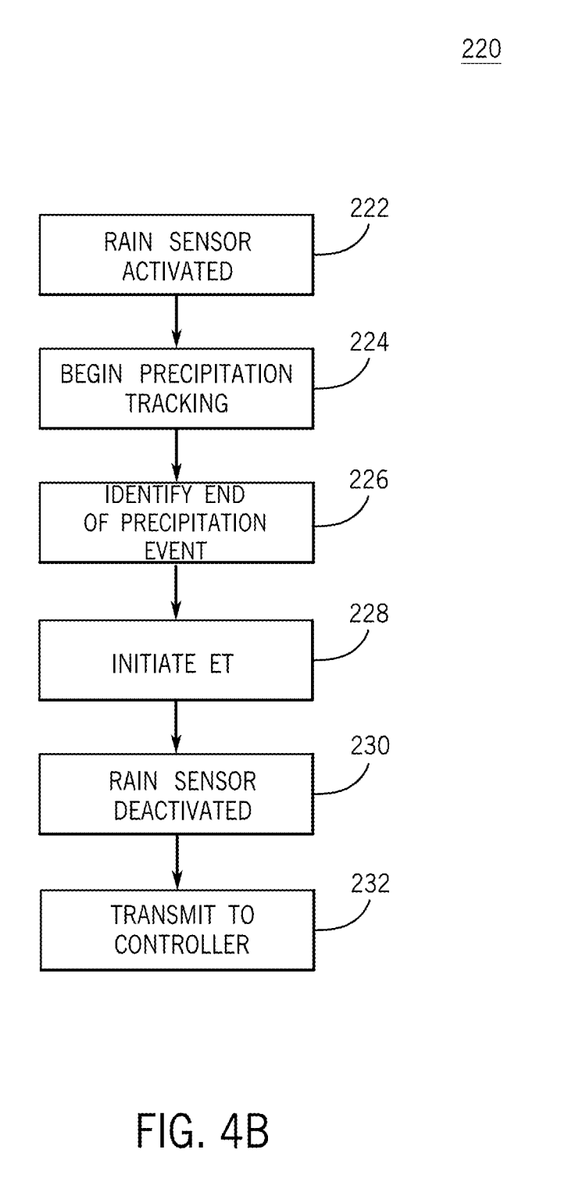
FIG. 4B is a flow chart illustrating a training method for determining precipitation data.

FIG. 4B illustrates another example of a method for estimating actual precipitation received. With reference to FIG. 4B, the method 220 may begin with operation 222 and the precipitation sensor 106 is activated as it is exposed to precipitation. The sensor 106 then actuates a sensor signal. As the sensor 106 is activated, a processing element, such as one of the controllers 102, 104, begins precipitation tracking. For example, the central controller 104 will begin to track the ON/OFF times of the precipitation sensor, along with meteorological records and events.

As the precipitation tracking begins, the method 220 may proceed to operation 226. In operation 226, the processing element (located at one of the central or local controller), identifies the end of a precipitation event. For example, the central controller 104 may receive meteorological data from a weather service, third party, or the like, indicating that the precipitation event for the area encompassing the precipitation sensor 106 has ended.

Once the precipitation event has ended, the method 220 may proceed to operation 228 and evapotranspiration tracking (ET) may begin. For example, the processing element (either the central or local controller) begins to track the ON signal time of the perception sensor 106 from the end of the precipitation event. Then, the once the sensor 106 has sufficiently dried, the method 220 proceeds to operation 230 and the perception sensor 106 is deactivated. The sensor ON/OFF time is then transmitted to one or both of the local and central controllers 102, 104 at operation 232. The time frame or saturation window between the end of the precipitation event in operation 226 and the deactivation of the precipitation sensor 106 signal in operation 230 is then used to determine any updates to the model for the precipitation sensor 106 that correlates sensor ON/OFF times with estimated received precipitation. In other words, by tracking the window from when the sensor was last exposed to precipitation to when the signal turns OFF, the system 100 can determine an evaporation rate of the sensor.

Using the weather data, such as precipitation estimates, precipitation event start and end times, along with data from the precipitation sensor 106, the central controller 106 can construct a model correlating sensor ON/OFF times with actual received precipitation. In other words, the central controller 104 can calibrate signal times with expected precipitation. In some instances, there may be a substantially linear relationship between the "dry time" of the precipitation sensor 106 (i.e., the time the sensor remains ON after the precipitation event has ended) and the actual precipitation received. In some instances, the system 100 of FIG. 1 may continue to calibrate or update the model during use in order to increase the sensitivity and predictive abilities of the model. For example, with some weather events, e.g., fog, mist, microbursts, etc., the signal from the sensor 106 may not correlate with the end time or expected precipitation from the weather data. By continuously calibrating the model with new precipitation data, outliers in the data can be thrown out or otherwise accounted for to ensure that the model remains accurate. This allows the model to be dynamically calibrated and adjusted, while simultaneously providing the scheduling adjustment for the irrigation schedules.

It should be noted that in some instances the precipitation sensor 106 may be configured to detect actual precipitation, such as a quantified rain sensor. In these examples, the controller may not need to translate the sensor signal into estimated precipitation, since the sensor may detect actual precipitation.

As discussed with respect to FIG. 3, the central controller 104 may receive precipitation data from multiple irrigation areas 124, such as from different properties in a similar region, each having a precipitation sensor 106 (e.g., multiple homes in the same zip code, neighborhood, or the like). This information can be used by the central controller 106 to predict precipitation for irrigation controllers 102 not directly connected to a precipitation sensor 106 and/or help to remove error in detected values for individual irrigation controllers 104. An example of this process is show in FIG. 5A.

Figure 5A:
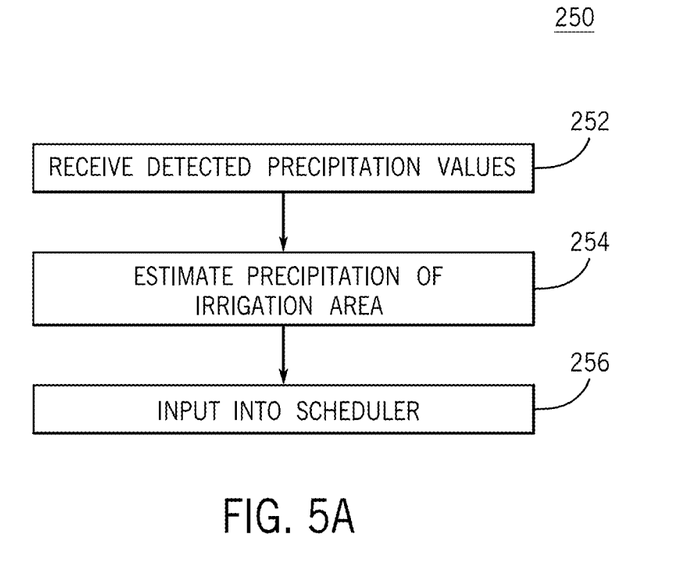
FIG. 5A is a flow chart illustrating a method for using detected precipitation values to improve scheduling for an irrigation controller for the watering system of FIG. 1.

With reference to FIG. 5A, a method for using detected precipitation values to improve scheduling for an irrigation controller is shown. The method 250 may begin with operation 252 and the central controller 104 may receive multiple detected precipitation values. The values may be transmitted from irrigation controllers 102, such as via the network 114, or may be received directly from precipitation sensors 106 (e.g., through the network 114). In embodiments where the values are received from the irrigation controller 102, the values may include the ON/OFF times for the precipitation sensor 106 or the estimated precipitation (i.e., the irrigation controller 102 may perform the precipitation estimation locally using the ON/OFF data and transmit those values rather than the raw data).

Once the central controller 104 receives data from multiple precipitation sensors 106, the method 250 may proceed to operation 254. In operation 254, the central controller 104 estimates precipitation at specific irrigation controller 102 irrigation areas 124 and/or zones 110a, 110b, 110c, 110d. For example, the central controller 104 may receive precipitation values from four precipitation sensors 106 in a 3 block radius. The central controller 104 may then aggregate and interpret those values and use the average as a detected precipitation for any irrigation areas 124 within the 3 block radius that do not include a precipitation sensor 106, e.g., statistical methods such as inverse distance weighted, kriging, or the like may be used. As another example, the central controller 104 may use the averaged precipitation values as an input for detected precipitation for all the irrigation controllers 102 in the area, including those with the precipitation sensors 106. In this example, combining the data with other devices may help to eliminate error specific to a particular device and increase the accuracy of the detected precipitation.

After operation 254, the method 250 may proceed to operation 256 and the detected precipitation may be input into a scheduler. As discussed above, the scheduler may be used to determine the watering schedules for multiple irrigation controllers 102 and/or a specific irrigation controller 102. The scheduler may then make changes to the irrigation schedule for irrigation controllers 102 according to the detected precipitation. The scheduler may be a module stored and executed on the central controller 104 or may be stored and executed on the irrigation controller 102 or a combination of the two devices 102, 104.

In some embodiments, the system 100 may be used to detect moisture level in the soil for an irrigation area 124. In these embodiments, the soil moisture information may be input to the scheduler or otherwise used by the central controller 104 to adjust irrigation schedules. For example, the soil moisture information may be used as a feedback loop for the system 100 to ensure that the vegetation is receiving proper watering.

Figure 5B:
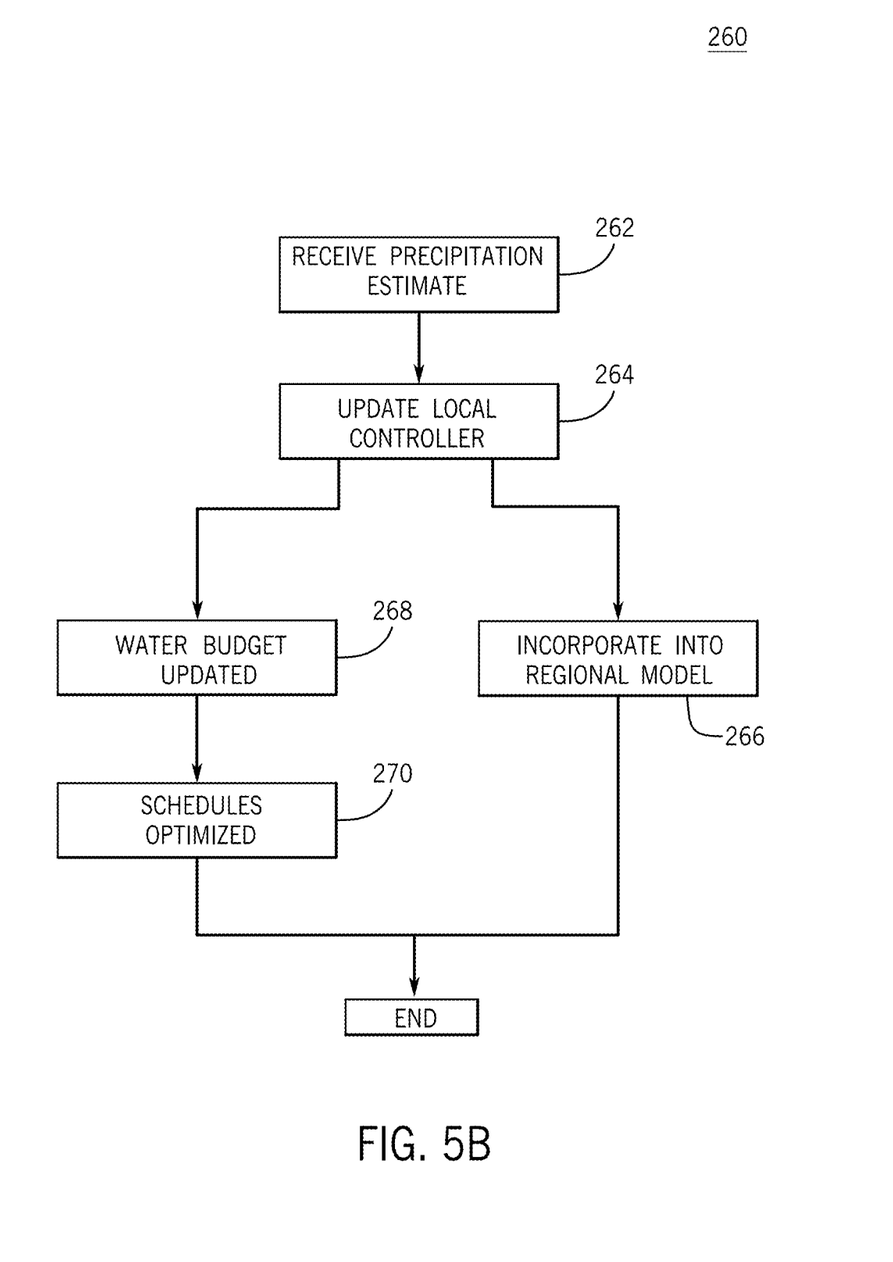
FIG. 5B is a flow chart illustrating an operational method for utilizing precipitation data to improve scheduling for one or more irrigation controllers.

FIG. 5B illustrates an example of an operational method for the system 100 of FIG. 1. With reference to FIG. 5B, the central controller 104 may receive precipitation estimates, such as through the precipitation sensor 106 ON/OFF data that has been translated using a method such as those illustrated as FIG. 4A or 4B to translate the signal into estimated precipitation. Once the precipitation estimate is received, the central controller 104 may update a current or local irrigation schedule or system schedule (e.g., local model) for a specific local irrigation controller 102. The irrigation controller 102 may then use the precipitation estimates to update water budgets in operation 268 and/or optimize watering schedules in operation 270 accordingly. Additionally, the precipitation estimates may also be used to update one or more regional controllers in operation 266. For example, the precipitation estimate may be used by the central controller 104 in operation 266 to optimize multiple controllers. For example, the central controller 104 may include a regional algorithm that can be used to adjust the watering schedules for individual controllers 102. In this example, the regional algorithm may receive input from multiple precipitation sensors 106 throughout a regional area and these data points can be used to provide global scheduling and water budgeting improvements for multiple controllers (e.g., those within a specified geographic location) and/or may be used to provide data to outside vendors or third parties.

Figure 6:
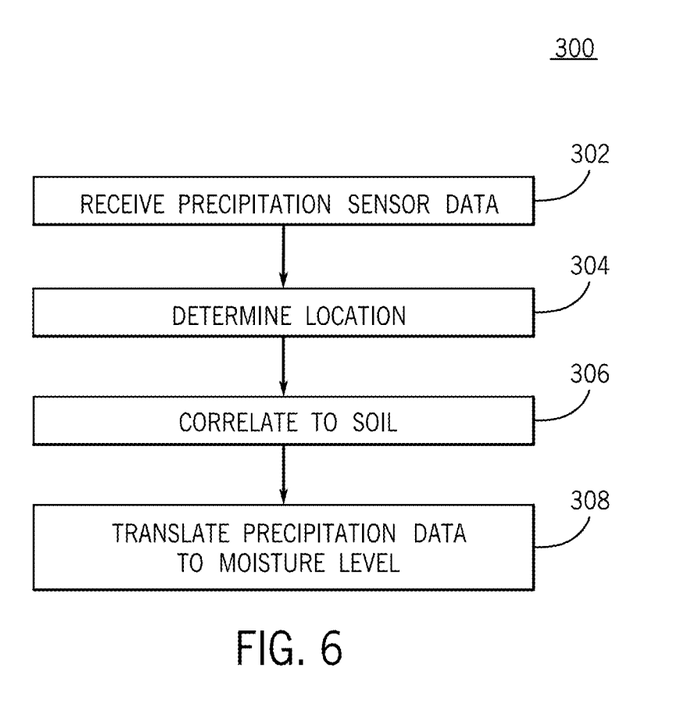
FIG. 6 illustrates a flow chart for a method to use the precipitation sensor as a soil moisture detector.

FIG. 6 illustrates a flow chart for a method to use the precipitation sensor as a soil moisture detector. With reference to FIG. 6, the method 300 may begin with operation 302 and the central controller 104 may receive precipitation sensor 106 data. The data may include the ON/OFF times, the set threshold, as well as manufacturer information (e.g., mechanical and physical characteristics of the sensor). After operation 302, the method 300 may proceed to operation 304 and the central controller 104 may determine the geographic location of the precipitation sensor 106. The geographic location may be determined based on information corresponding to the irrigation controller 102, as well as data corresponding to the zone 110a, 110b, 110c, 110d information and sensor location within the zones. For example, each irrigation controller 102 may include data corresponding to the location of the precipitation sensor 106, as well as its own location. This information may be input by a user during a setup process or may be automatically detected such as through a global positioning sensor or the like.

After operation 304, the method 300 may proceed to operation 306. In operation 306, the central controller 104 may use information about the precipitation sensor 106 and correlate the sensor 106 to a particular soil type in the area. For example, a particular manufacture model sensor may have an ETo rate that matches a common soil in the area and thus the sensor 106 can be correlated to the soil type. As another example, the porosity of the sensor collection mechanism may match a particular soil in a specified geographic location and correlated directly other soil types.

Once the precipitation sensor 106 is correlated to one or more soil types in the particular location, the method 300 may proceed to operation 308. In operation 308, the central controller 104 translates the precipitation sensor 106 data to a moisture level of the soil. For example, if the precipitation sensor 106 surpasses its precipitation threshold of 1" at 2 pm and does not dry out for 190 minutes, the central controller 104 may determine that the soil in the area surrounding the precipitation sensor 106 may have a moisture level of 30%. The moisture level may then be used as an input into a scheduler in order to vary the irrigation schedules for one or more irrigation controllers 102 in the area. The radius of the area may vary based on a number of different factors, including, but not limited to, soil consistency, weather, number of controllers, and the like.

In some embodiments, the system 100 may use multiple precipitation sensors 106 from different manufactures to assess different types of soil, as well as different soil locations. For example, a first house may have a first brand of precipitation sensor and a second house five blocks away from the first house may have a second brand of precipitation sensor. The first brand of sensor may be correlated to a first type of soil and the second brand sensor may be correlated to a second type of soil. The first house may have an irrigation area having both the first and second types of soil and the precipitation sensor data from both the first sensor and the second sensor may be used to estimate the soil moisture for the two types of soil and vary the irrigation schedules for those zones accordingly. In this manner, the moisture level for many different types of soil in a particular geographical area may be estimated to enhance the irrigation scheduling and reduce water waste.

In other examples, a method similar to the learning methods discussed above can be used to build models and predicative capabilities for moisture probes as well.

Figure 7:
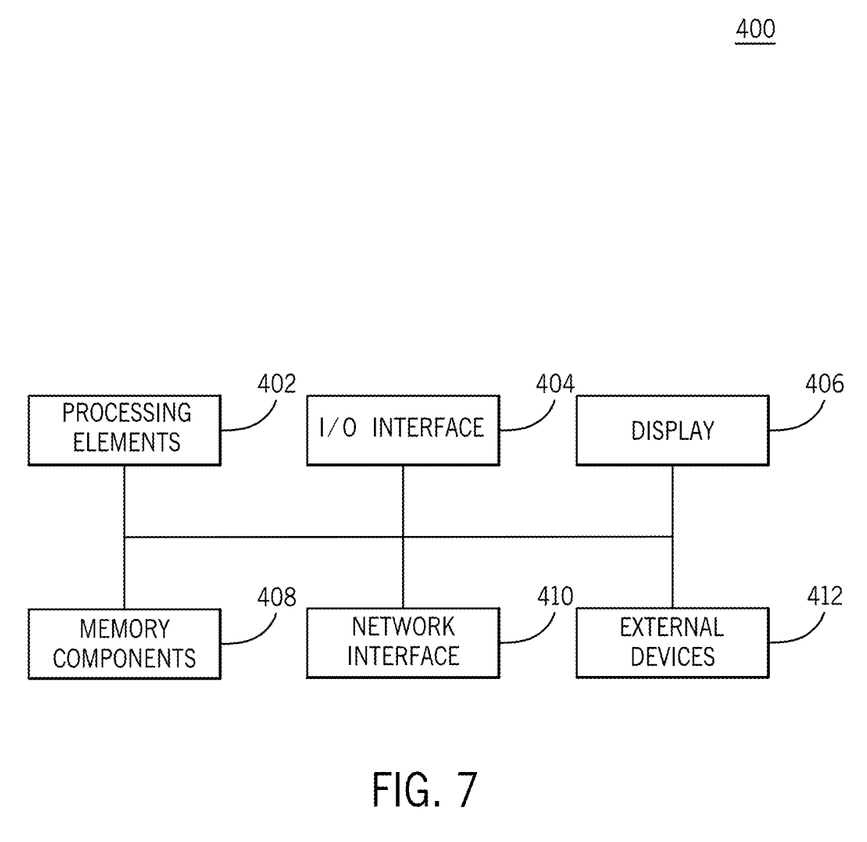
FIG. 7 is a simplified block diagram of a computing device that can be used by one or more components of the system of FIG. 1.

A simplified block structure for a computing device that may be used with the system 100 or integrated into one or more of the system 100 components is shown in FIG. 7. For example, the central controller 104, user devices 108a-108n, and/or irrigation controllers 102, 112 may include one or more of the components shown in FIG. 7 and be used to execute one or more of the operations disclosed in methods 150, 200, 220, 250, 260, and 300. With reference to FIG. 7, the computing device 400 may include one or more processing elements 402, an input/output interface 404, a display 406, one or more memory components 408, a network interface 410, and one or more external devices 412. Each of the various components may be in communication with one another through one or more busses, wireless means, or the like.

The processing element 402 is any type of electronic device capable of processing, receiving, and/or transmitting instructions. For example, the processing element 402 may be a central processing unit, microprocessor, processor, or microcontroller. Additionally, it should be noted that select components of the computer 400 may be controlled by a first processor and other components may be controlled by a second processor, where the first and second processors may or may not be in communication with each other.

The memory components 408 are used by the computer 400 to store instructions for the processing element 402, as well as store data, such as the fluid device data, historical data, and the like. The memory components 408 may be, for example, magneto-optical storage, read-only memory, random access memory, erasable programmable memory, flash memory, or a combination of one or more types of memory components.

The display 406 provides visual feedback to a user and, optionally, can act as an input element to enable a user to control, manipulate, and calibrate various components of the computing device 400. The display 406 may be a liquid crystal display, plasma display, organic light-emitting diode display, and/or cathode ray tube display. In embodiments where the display 406 is used as an input, the display may include one or more touch or input sensors, such as capacitive touch sensors, resistive grid, or the like.

The I/O interface 404 allows a user to enter data into the computer 400, as well as provides an input/output for the computer 400 to communicate with other devices (e.g., flow controller 104, flow detector 102, other computers, speakers, etc.). The I/O interface 404 can include one or more input buttons, touch pads, and so on.

The network interface 410 provides communication to and from the computer 400 to other devices. For example, the network interface 410 allows the server 110 to communicate with the flow controller 104 and the flow detector 102 through the network 114. The network interface 410 includes one or more communication protocols, such as, but not limited to WiFi, Ethernet, Bluetooth, and so on. The network interface 410 may also include one or more hard-wired components, such as a Universal Serial Bus (USB) cable, or the like. The configuration of the network interface 410 depends on the types of communication desired and may be modified to communicate via WiFi, Bluetooth, and so on.

The external devices 412 are one or more devices that can be used to provide various inputs to the computing device 400, e.g., mouse, microphone, keyboard, trackpad, or the like. The external devices 412 may be local or remote and may vary as desired.

CONCLUSION

The foregoing description has broad application. For example, while examples disclosed herein may focus on residential water systems, it should be appreciated that the concepts disclosed herein may equally apply to other water systems, such as commercial properties. Similarly, although the system is discussed with respect to water sources, the system and methods may be used with substantially any other type of fluid systems. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed is:

1. A method for adjusting an irrigation schedule for an irrigation system comprising:
    receiving by a sprinkler controller a precipitation signal corresponding to received precipitation from a precipitation sensor, wherein the precipitation signal comprises an ON signal output by a precipitation sensor at a first time, the ON signal indicating that the precipitation sensor has absorbed a predetermined volume of water, and a termination of the ON signal output by the precipitation sensor at a second time, the termination indicating sufficient water has evaporated from the precipitation sensor to drop below the predetermined volume of water;
    transmitting by the sprinkler controller the precipitation signal to a central controller, wherein the central controller is configured to:
        determine a saturation window between the first time and the second time, the saturation window corresponding to a time for the sufficient water evaporation to occur,
        determine an evapotranspiration rate at the precipitation sensor,
        estimate a value of actual precipitation received at the precipitation sensor based on the saturation window and the evapotranspiration rate, and
        adjust an irrigation schedule accounting for the estimated value of actual precipitation;
    receiving by the sprinkler controller the adjusted irrigation schedule; and
    activating by the sprinkler controller one or more sprinkler valves based on the adjusted irrigation schedule.

2. The method of claim 1, wherein termination of the ON signal indicates that the precipitation sensor has dried, and the method further comprises time stamping by the sprinkler controller the drying event.

3. The method of claim 1, wherein the adjusted irrigation schedule comprises instructions to skip or shorten at least one scheduled watering event for an irrigation area, wherein the at least one scheduled watering event occurs outside the saturation window.

4. The method of claim 1, wherein estimating the value of actual precipitation received at the precipitation sensor is further based on temperature or humidity, such that adjusting the irrigation schedule accounts for temperature or humidity.

5. The method of claim 1, wherein to adjust the irrigation schedule, the central controller is further configured to compare the estimated value of actual precipitation received to watering needs of vegetation watered by the one or more sprinkler valves to determine variations to watering times and/or frequency.

6. The method of claim 1, wherein the precipitation sensor comprises a hygroscopic disk, and the hygroscopic disk
- expands as water is absorbed, the expansion actuating a lever from an off position to an on position, and
- shrinks as water evaporates, the shrinking deactivating the lever from the on position to the off position.

7. The method of claim 1, wherein the central controller is further configured to estimate precipitation received by an area irrigated by the one or more sprinkler valves, wherein the estimation is based on the irrigation schedule, the saturation window, and meteorological data.

8. The method of claim 1, wherein the central controller is further configured to estimate a soil moisture level based on the saturation window, and further adjust the irrigation schedule to account for the estimated soil moisture level.

9. The method of claim 1, wherein the ON signal is a persistent signal that remains on for the duration of the saturation window.

10. The method of claim 1, wherein the central controller is further configured to estimate the value of actual precipitation received at the precipitation sensor based on one or more precipitation sensor characteristics.

* * * * *